United States Patent
Alshoaibi et al.

(10) Patent No.: US 12,062,780 B1
(45) Date of Patent: Aug. 13, 2024

(54) HYDROVOLTAIC POWER GENERATION DEVICES UTILIZING CARBON SPHERE-COATED NICKEL FOAM/PET SUBSTRATE

(71) Applicant: KING FAISAL UNIVERSITY, Al-Ahsa (SA)

(72) Inventors: Adil Alshoaibi, Al-Ahsa (SA); Majid Khan, Mardan (PK)

(73) Assignee: KING FAISAL UNIVERSITY, Al-Ahsa (SA)

( * ) Notice: Subject to any disclaimer, the term of this patent is extended or adjusted under 35 U.S.C. 154(b) by 17 days.

(21) Appl. No.: 18/413,239

(22) Filed: Jan. 16, 2024

(51) Int. Cl.
| | | |
|---|---|---|
| *H01M 4/36* | (2006.01) | |
| *H01M 4/04* | (2006.01) | |
| *H01M 4/583* | (2010.01) | |
| *H01M 4/66* | (2006.01) | |
| *H01M 4/80* | (2006.01) | |
| *H01M 14/00* | (2006.01) | |

(52) U.S. Cl.
CPC ......... *H01M 4/364* (2013.01); *H01M 4/0404* (2013.01); *H01M 4/0471* (2013.01); *H01M 4/583* (2013.01); *H01M 4/661* (2013.01); *H01M 4/667* (2013.01); *H01M 4/808* (2013.01); *H01M 14/00* (2013.01)

(58) Field of Classification Search
None
See application file for complete search history.

(56) References Cited

U.S. PATENT DOCUMENTS

| | | | |
|---|---|---|---|
| 11,476,464 B1 * | 10/2022 | Li | C01B 32/168 |
| 2021/0291497 A1 * | 9/2021 | Shin | C22C 1/08 |
| 2023/0261209 A1 * | 8/2023 | Wang | H01M 10/0525 |
| | | | 429/245 |

FOREIGN PATENT DOCUMENTS

WO   WO-2018067391 A1 *   4/2018   .......... H01M 4/0471

OTHER PUBLICATIONS

Wei, et al.; "Integrated carbon spheres on nickel foam as electrode for supercapacitors", DOI: https://doi.org/10.1049/mnl.2012.0885.
Li, et al.; "NiMnCr layered double hydroxide-carbon spheres modified Ni foam: An efficient positive electrode for hybrid supercapacitors", DOI: https://doi.org/10.1016/j.cej.2020.125370.
Wang, et al.; "One-pot synthesis of nickel oxide-carbon composite microspheres on nickel foam for supercapacitors", DOI: https://doi.org/10.1007/s10853-011-6021-7.
Song, et al.; "Efficient and Stable Carbon-coated Nickel Foam Cathodes for the Electro-Fenton Process", DOI: https://doi.org/10.1016/j.electacta.2015.07.029.
Chinthaginjala, et al.; "How Carbon-Nano-Fibers attach to Ni foam", DOI: https://doi.org/10.1016/j.carbon.2008.07.002.

* cited by examiner

*Primary Examiner* — Scott J. Chmielecki
(74) *Attorney, Agent, or Firm* — Nath, Goldberg & Meyer; Richard C. Litman

(57) ABSTRACT

A process for preparing carbon spheres coated on a nickel (Ni) foam/polyethylene terephthalate (PET) substrate, as well as the use of the obtained product in the field of hydrovoltaic energy generation.

16 Claims, No Drawings

HYDROVOLTAIC POWER GENERATION DEVICES UTILIZING CARBON SPHERE-COATED NICKEL FOAM/PET SUBSTRATE

BACKGROUND

1. Field

The disclosure of the present patent application relates to a process for preparing carbon spheres coated on a nickel (Ni) foam/polyethylene terephthalate (PET) substrate, as well as the use of the obtained product in the field of hydrovoltaic energy generation.

2. Description of the Related Art

Electrode materials for supercapacitors have been extensively developed because of the increasing demand for a new kind of accumulator of electrical energy with high specific power and long durability. Owing to the high tap density of carbon spheres (CSs), a large number of materials have been loaded on CSs to achieve a high volumetric energy density. In addition, the initial irreversible capacity loss that arises from the formation of a passivation layer on the carbon surface can be minimized because of a smaller surface area inherent from their spherical shape. In these cases, there have been considerable attempts to use CSs for the construction of electrodes in supercapacitors. One such attempt used a precipitation method to prepare microporous carbon nanospheres without any activation process, and the specific capacitance was as high as 154 F/g. In another attempt, mesoporous CSs with hierarchical foam-like pore structures, and a high specific capacitance of 208 F/g at a current density of 0.5 A/g, was obtained.

To apply the supercapacitors to various practical devices, especially in relation to electric vehicles, the development of supercapacitors with both high-power density and high-energy density is required. The factors that greatly restrict the above two properties of supercapacitors include internal resistivity of the electrode itself, the resistivity between the electrode and current collector and the resistivity of the electrolyte.

Layered double hydroxides (LDHs), $M^{2+}_{1-x}M^{3+}_x(OH)_2(A^{n-})_{x/n} \cdot mH_2O$, $M^{2+}$ and $M^{3+}$ correspond to ($Ni^{2+}$, $Co^{2+}$, $Cu^{2+}$, $Mg^{2+}$, $Mn^{2+}$) and ($Al^{3+}$, $V^{3+}$, $Fe^{3+}$, $Cr^{3+}$) metal cations, respectively, $A^{n-}$ represents the interlayer anion ($NO_3^-$, $CO_3^{2-}$, $OH^-$), $x=M^{3+}/(M^{2+}+M^{3+})$ is the surface charge, have evoked great attraction on the basis of their well-defined and high redox activity, and environmentally friendly nature. They have been employed in several processes such as oxygen evolution reaction, hydrogen evolution reaction, corrosion protection, hot coal gas desulfurization, supercapacitors, and so on.

Supercapacitors are still not applied on a large scale because of their relatively low energy density (E). Given that E is related to the capacitance (C) and the operation potential window ($\Delta V$) according to $E=0.5C\Delta V^2$, the fabrication of hybrid supercapacitors represents an effective means to enlarge the operation potential window. Generally, carbon materials (activated carbon, carbon nanotubes, graphene, etc.) are applied as the negative electrodes for hybrid supercapacitors, owing to their large working potential window and stability. However, designing new suitable and cost-effective negative electrode materials is an unmet need for future developments of energy storage devices.

Thus, methods and products for solving the aforementioned problems are desired.

SUMMARY

The present subject matter relates to an innovative process for producing and thoroughly analyzing carbon spheres coated on a Ni foam/PET substrate. In various embodiments, the present subject matter relates to synthesizing carbon spheres, depositing carbon spheres onto a Ni foam using Nafion as a binder, and the use of carbon spheres coated Ni foam/PET devices in the field of hydrovoltaic energy generation.

Accordingly, in an embodiment, the present subject matter relates to a novel two-electrode device dipped in the flow of water to determine open circuit potential. In certain embodiments, the present subject matter relates to carbon spheres coated Ni foam exhibiting an amorphous carbon structure, resulting in a significantly increased surface area, and a novel composition of carbon spheres/Ni foam comprising functional groups, specifically hydroxyl groups, that exhibit enhanced water uptake properties. These functional groups can provide distinct advantages for efficient water absorption. In certain embodiments, the present hydrovoltaic technology demonstrates an outstanding Open Circuit Potential (OCP) of around 0.077V when subjected to standard room temperature conditions. Accordingly, the present products can provide a highly efficient method and apparatus for generating hydrovoltaic power.

A method for analyzing such synthesized materials is further included herein. The method involves employing various analytical techniques, including but not limited to X-ray diffraction (XRD), scanning electron microscopy (SEM), Fourier-transform infrared spectroscopy (FTIR), and UV-Vis spectroscopy to examine the crystal structure, morphology, chemical bonds, and optical properties of the carbon spheres and carbon spheres coated nickel foam/PET that were synthesized. Performance evaluation of the obtained hydrovoltaic devices include open circuit potential (OCP), cyclic voltammetry (CV), and electrochemical impedance spectroscopy (EIS).

In an embodiment, the present subject matter relates to a method of producing carbon spheres coated on a Nickel (Ni) Foam/Polyethylene Terephthalate (PET) substrate, the method comprising: obtaining carbon spheres; sticking a nickel foam substrate to a polyethylene terephthalate (PET) substrate to obtain the Ni Foam/PET Substrate; combining the carbon spheres with Nafion to form a mixture; depositing the mixture onto the Ni Foam/PET substrate using a drop-casting technique; and obtaining the carbon spheres coated on the Ni Foam/PET substrate.

In another embodiment, the present subject matter relates to carbon spheres coated on a Nickel (Ni) Foam/Polyethylene Terephthalate (PET) substrate prepared according to the methods as described herein.

In an additional embodiment, the present subject matter relates to an active electrode for use in a hydrovoltaic device comprising the carbon spheres coated on a Nickel (Ni) Foam/Polyethylene Terephthalate (PET) substrate as described herein.

In a further embodiment, the present subject matter relates to a method of hydrovoltaic power generation, the method comprising: providing a two-electrode hydrovoltaic device, wherein at least one of the two electrodes in the two-electrode hydrovoltaic device is the active electrode as described herein; dipping the two-electrode hydrovoltaic device into a water flow; and generating hydrovoltaic power.

These and other features of the present subject matter will become readily apparent upon further review of the following specification and drawings.

DETAILED DESCRIPTION OF THE PREFERRED EMBODIMENTS

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

An "effective amount" of a composition as described herein is an amount sufficient to carry out a specifically stated purpose. An "effective amount" may be determined empirically and in a routine manner, in relation to the stated purpose.

The present subject matter relates to an innovative process for producing and thoroughly analyzing carbon spheres coated on a Ni foam/PET substrate. In various embodiments, the present subject matter relates to synthesizing carbon spheres, depositing carbon spheres onto a Ni foam using Nafion as a binder, and the use of carbon spheres coated Ni foam/PET devices in the field of hydrovoltaic energy generation.

Hydrovoltaic power generation is possible with the known components (carbon spheres, nickel foam, PET substrate), but it is not previously evident how to put them all together in a coherent system. One novel and highly effective strategy for accelerating streaming potential is the preparation of carbon spheres from sucrose and citric acid, which are then applied to nickel foam stabilized with Nafion. The non-obviousness of the technology is attributed to several factors, including the amorphous structure of the carbon spheres and the presence of hydroxyl functional groups on their surfaces, which significantly enhance the open circuit potential at room temperature.

Accordingly, in an embodiment, the present subject matter relates to a novel two-electrode device dipped in the flow of water to determine open circuit potential. In certain embodiments, the present subject matter relates to carbon spheres coated Ni foam exhibiting an amorphous carbon structure, resulting in a significantly increased surface area, and a novel composition of carbon spheres/Ni foam comprising functional groups, specifically hydroxyl groups, that exhibit enhanced water uptake properties. These functional groups can provide distinct advantages for efficient water absorption. In certain embodiments, the present hydrovoltaic technology demonstrates an outstanding Open Circuit Potential (OCP) of around 0.077V when subjected to standard room temperature conditions. Accordingly, the present products can provide a highly efficient method and apparatus for generating hydrovoltaic power.

A method for analyzing such synthesized materials is further included herein. The method involves employing various analytical techniques, including but not limited to X-ray diffraction (XRD), scanning electron microscopy (SEM), Fourier-transform infrared spectroscopy (FTIR), and UV-Vis spectroscopy to examine the crystal structure, morphology, chemical bonds, and optical properties of the carbon spheres and carbon spheres coated nickel foam/PET that were synthesized. Performance evaluation of the obtained hydrovoltaic devices include open circuit potential (OCP), cyclic voltammetry (CV), and electrochemical impedance spectroscopy (EIS).

In an embodiment, the present subject matter relates to a method of producing carbon spheres coated on a Nickel (Ni) Foam/Polyethylene Terephthalate (PET) substrate, the method comprising: obtaining carbon spheres; sticking a nickel foam substrate to a polyethylene terephthalate (PET) substrate to obtain the Ni Foam/PET Substrate; combining the carbon spheres with Nafion to form a mixture; depositing the mixture onto the Ni Foam/PET substrate using a drop-casting technique; and obtaining the carbon spheres coated on the Ni Foam/PET substrate.

In an embodiment of the present production methods, the carbon spheres can be combined with the Nafion in a 1:1 ratio, by weight.

In an additional embodiment of the present production methods, the nickel foam substrate can be formed from nickel foam sheets. In certain embodiments, the nickel foam sheets can be cleaned using a mixture of acetone and ethanol prior to the sticking step.

In another embodiment of the present production methods, the carbon spheres can be obtained by a method comprising: dissolving sucrose in deionized water, followed by addition of citric acid to obtain a precursor mixture; hydrothermally treating the precursor mixture to form initial carbon spheres; separating the initial carbon spheres from the precursor mixture and washing the separated initial carbon spheres; and obtaining the carbon spheres.

In an embodiment of these production methods, the hydrothermal treatment can be performed at about 170° C. to about 230° C., about 180° C. to about 220° C., at about 180° C., at about 200° C., and/or at about 220° C.

In an additional embodiment of these production methods, the initial carbon spheres can separated from the precursor mixture using a filtration process.

In another embodiment of these production methods, the washing the separated initial carbon spheres can be conducted by first washing the initial carbon spheres with deionized water, then rinsing the initial carbon spheres with ethanol. In this regard, the washed initial carbon spheres can then be dried at about 75° C. to about 85° C., or at about 80° C.

The present subject matter distinguishes itself through the method of depositing carbon spheres onto a nickel foam substrate, thereby enabling the tailoring of material characteristics. Accordingly, the unique and promising features of the present subject matter lie in the amorphous characteristics exhibited by the carbon spheres, which are accompanied by the presence of hydroxyl groups, deposited on the Ni foam/PET substrate. Furthermore, the enhancement of open circuit potential at room temperature is another innovation possible herein.

In another embodiment, the present subject matter relates to carbon spheres coated on a Nickel (Ni) Foam/Polyethylene Terephthalate (PET) substrate prepared according to the methods as described herein.

In this regard, the carbon spheres coated on a Nickel (Ni) Foam/Polyethylene Terephthalate (PET) substrate as described herein can exhibit an amorphous carbon structure. In an embodiment, the carbon spheres coated on a Nickel (Ni) Foam/Polyethylene Terephthalate (PET) substrate as described herein can comprise hydroxyl functional groups.

In an additional embodiment, the present subject matter relates to an active electrode for use in a hydrovoltaic device comprising the carbon spheres coated on a Nickel (Ni) Foam/Polyethylene Terephthalate (PET) substrate as described herein.

In a further embodiment, the present subject matter relates to a method of hydrovoltaic power generation, the method comprising: providing a two-electrode hydrovoltaic device, wherein at least one of the two electrodes in the two-electrode hydrovoltaic device is the active electrode as described herein; dipping the two-electrode hydrovoltaic device into a water flow; and generating hydrovoltaic power. In this regard, the two-electrode hydrovoltaic device can have an open circuit potential (OCP) of about 0.077V at room temperature.

By employing carbon spheres on nickel foam/PET substrates as highly efficient devices, hydrovoltaic power generation can be significantly enhanced, thus contributing to the development of a sustainable energy resource. In conjunction with the distinctive characteristics of the materials, the economical and expandable synthesis method situates this technology for incorporation into sustainable energy systems. By accommodating diverse market segments such as renewable energy startups and energy storage, it demonstrates commercial viability and contributes to the ongoing shift towards sustainable energy sources.

In an additional embodiment, the present subject matter relates to a novel two-electrode device dipped in the flow of water to determine the open circuit potential, as well as an accompanying method for analyzing synthesized materials. The method can involve employing various analytical techniques, including X-ray diffraction, scanning electron microscopy, energy-dispersive X-ray spectroscopy, UV-Vis spectroscopy, Fourier-transform infrared spectroscopy, and electrochemical analysis. The carbon spheres coated Ni foam can exhibit an amorphous carbon structure, resulting in a significantly increased surface area, and a novel composition of carbon spheres/Ni foam comprising functional groups, specifically hydroxyl groups, that exhibit enhanced water uptake properties. These functional groups provide distinct advantages for efficient water absorption.

The current hydrovoltaic technology can demonstrate an outstanding OCP of around 0.077V when subjected to standard room temperature conditions. Accordingly, the present subject matter includes a highly efficient method and apparatus for generating hydrovoltaic power.

The present teachings can be further understood by referring to the following examples.

EXAMPLES

Example 1

Synthesis of Carbon Spheres

Carbon spheres were synthesized via a hydrothermal approach employing sucrose and citric acid as precursor materials. The chemical reaction under investigation involves the interaction between $C_{12}H_{22}O_{11}$ (sucrose) and $C_6H_8O_7$ (citric acid) as a catalyst.

To initiate the reaction, a precursor solution was prepared by dissolving 10.0 mg of sucrose in deionized water and stirred for one hour and then, 2.0 mg of citric acid was added to the mixture. The resulting mixture was then subjected to stirring for 30 minutes. The precursor solution obtained from the experimental process was carefully transferred into a Teflon liner, which was subsequently positioned within a stainless-steel vessel autoclave. Hydrothermal treatment was performed at temperatures of 180° C., 200° C., and 220° C.

Following the hydrothermal treatment, the carbon spheres that were formed underwent separation from the reaction mixture through a filtration process. The collected carbon spheres were thoroughly washed using a two-step process to remove any remaining impurities. First, the carbon spheres were washed with deionized water to eliminate any water-soluble contaminants. After the water wash, the carbon spheres were rinsed with ethanol to further remove any remaining impurities. The washed carbon spheres obtained from the previous step were subjected to a drying process at a temperature of 80° C.

Example 2

Deposition of Carbon Spheres on Nickel Foam/PET Substrate

Nickel foam substrates were prepared by cutting nickel foam sheets into (2×4) cm dimensions. The nickel foam was then thoroughly cleaned using a mixture of acetone and ethanol to remove any impurities or contaminants. The cleaned nickel foam was subsequently dried under a vacuum and stuck to the PET substrate. Carbon spheres were combined with Nafion in a 1:1 ratio to form a mixture. The drop-casting technique was employed to deposit the resulting mixture onto the nickel foam/PET substrates.

Example 3

Construction of Hydrovoltaic Devices

The hydrovoltaic devices were assembled by combining carbon-sphere-coated nickel foam and PET substrates. The carbon-sphere-coated nickel foam served as the active electrode, while the PET substrate provided structural support. The assembled hydrovoltaic devices were subjected to hydrovoltaic power generation experiments to evaluate their performance. The devices were configured using a carbon sheet as one electrode. The carbon sheet was deposited onto a nickel foam/PET substrate using copper tape on the lower side of the device. These devices were electrochemically characterized immersed in 5 cm water container with room temperature conditions.

Example 4

Materials Analysis

The analysis of these materials employed various characterization techniques. X-ray diffraction (XRD), scanning electron microscopy (SEM), Fourier-transform infrared spectroscopy (FTIR), and UV-Vis spectroscopy were employed to examine the crystal structure, morphology, chemical bonds, and optical properties of the carbon spheres and carbon spheres coated nickel foam/PET that were synthesized. Performance evaluation of hydrovoltaic devices included open circuit potential (OCP), cyclic voltammetry (CV), and electrochemical impedance spectroscopy (EIS). The investigations have yielded significant insights pertaining to the electrochemical characteristics and capillary action of water in carbon spheres coated nickel foam/PET devices. These findings have contributed to the advancement of our understanding regarding the qualities of such devices, as well as their potential utility in the field of hydrovoltaic power generation.

It is to be understood that the process for preparing carbon spheres coated on a nickel (Ni) foam/polyethylene terephthalate (PET) substrate and resultant products and uses are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method of producing carbon spheres coated on a Nickel (Ni) Foam/Polyethylene Terephthalate (PET) substrate, the method comprising:

obtaining carbon spheres;
sticking a nickel foam substrate to a polyethylene terephthalate (PET) substrate to obtain the Ni Foam/PET Substrate;
combining the carbon spheres with Nafion to form a mixture;
depositing the mixture onto the Ni Foam/PET substrate using a drop-casting technique; and
obtaining the carbon spheres coated on the Ni Foam/PET substrate.

2. The method of claim 1, wherein the carbon spheres are combined with the Nafion in a 1:1 ratio, by weight.

3. The method of claim 1, wherein the nickel foam substrate is formed from nickel foam sheets.

4. The method of claim 3, wherein the nickel foam sheets are cleaned using a mixture of acetone and ethanol prior to the sticking step.

5. The method of claim 1, wherein the carbon spheres are obtained by a method comprising:

dissolving sucrose in deionized water, followed by addition of citric acid to obtain a precursor mixture;
hydrothermally treating the precursor mixture to form initial carbon spheres;
separating the initial carbon spheres from the precursor mixture and washing the separated initial carbon spheres; and
obtaining the carbon spheres.

6. The method of claim 5, wherein the hydrothermal treatment is performed at about 170° C. to about 230° C.

7. The method of claim 6, wherein the hydrothermal treatment is performed at about 180° C. to about 220° C.

8. The method of claim 5, wherein the initial carbon spheres are separated from the precursor mixture using a filtration process.

9. The method of claim 5, wherein the washing the separated initial carbon spheres is conducted by first washing the initial carbon spheres with deionized water, then rinsing the initial carbon spheres with ethanol.

10. The method of claim 9, wherein the washed initial carbon spheres are then dried at about 75° C. to about 85° C.

11. Carbon spheres coated on a Nickel (Ni) Foam/Polyethylene Terephthalate (PET) substrate prepared according to the method of claim 1.

12. The carbon spheres coated on a Nickel (Ni) Foam/Polyethylene Terephthalate (PET) substrate of claim 11 exhibiting an amorphous carbon structure.

13. The carbon spheres coated on a Nickel (Ni) Foam/Polyethylene Terephthalate (PET) substrate of claim 11 comprising hydroxyl functional groups.

14. An active electrode for use in a hydrovoltaic device comprising the carbon spheres coated on a Nickel (Ni) Foam/Polyethylene Terephthalate (PET) substrate of claim 11.

15. A method of hydrovoltaic power generation, the method comprising:

providing a two-electrode hydrovoltaic device, wherein at least one of the two electrodes in the two-electrode hydrovoltaic device is the active electrode of claim 13;
dipping the two-electrode hydrovoltaic device into a water flow; and
generating hydrovoltaic power.

16. The method of claim 15, wherein the two-electrode hydrovoltaic device has an open circuit potential (OCP) of about 0.077V at room temperature.

* * * * *